(12) United States Patent
Woerz

(10) Patent No.: US 8,485,341 B2
(45) Date of Patent: Jul. 16, 2013

(54) DEVICE AND METHOD FOR GROUPING PACKAGES

(75) Inventor: Norbert Woerz, Erkheim (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 404 days.

(21) Appl. No.: 12/828,552

(22) Filed: Jul. 1, 2010

(65) Prior Publication Data

US 2011/0005171 A1      Jan. 13, 2011

(30) Foreign Application Priority Data

Jul. 2, 2009 (DE) .......................... 10 2009 031 516

(51) Int. Cl.
*B65G 47/30* (2006.01)
*B65B 5/10* (2006.01)

(52) U.S. Cl.
USPC ...................................... 198/418.9

(58) Field of Classification Search
USPC .................. 198/418.7, 418.9, 457.01, 460.3, 198/589, 617
See application file for complete search history.

(56) References Cited

U.S. PATENT DOCUMENTS

| | | | |
|---|---|---|---|
| 2,748,917 A * | 6/1956 | Rawe | 198/418.9 |
| 3,348,655 A | 10/1967 | Pierce, Jr. et al. | |
| 3,690,438 A | 9/1972 | Goodman | |
| 4,135,616 A * | 1/1979 | Pellaton | 198/418.9 |
| 4,446,675 A | 5/1984 | Mewes | |
| 4,984,677 A * | 1/1991 | Prakken | 198/418.6 |
| 5,100,124 A * | 3/1992 | Pouliquen | 271/183 |
| 5,507,134 A | 4/1996 | Takeda et al. | |
| 5,881,532 A * | 3/1999 | Kitagawa | 53/54 |
| 6,003,286 A * | 12/1999 | Goodman | 53/537 |
| 6,659,445 B2 * | 12/2003 | Boss | 271/9.13 |
| 7,021,450 B2 * | 4/2006 | Jones, Jr. | 198/462.1 |
| 7,065,936 B2 * | 6/2006 | Lindee et al. | 53/251 |
| 7,497,318 B2 * | 3/2009 | Lin | 198/418.9 |
| 7,909,157 B2 * | 3/2011 | Giuliani | 198/418.4 |
| 8,292,061 B2 * | 10/2012 | Iwasa et al. | 198/407 |

FOREIGN PATENT DOCUMENTS

| | | |
|---|---|---|
| AT | 403 793 B | 5/1998 |
| DE | 31 22 021 A1 | 5/1982 |

OTHER PUBLICATIONS

German Office Action Dated Apr. 1, 2010, Applicant MULTIVAC Sepp Haggenmueller GmbH & Co. KG, Application No. 10 2009 031 516.0-27.

* cited by examiner

*Primary Examiner* — Douglas Hess
(74) *Attorney, Agent, or Firm* — Husch Blackwell LLP

(57) ABSTRACT

The disclosure relates to a device (1) with at least one grouping belt (3) for the transport and/or grouping of packages (5) with a dimensionally stable protruding edge (9) and including means for moving two adjacent packages towards one another and for overlapping the protruding edges (9), whereby the edge (9) of the preceding package comes to rest over the edge (9) of the following package on the grouping belt (3). The disclosure further relates to a method of operating a device (1) of this nature preferably in packaging systems with deep-draw packaging machines or tray sealing machines and to the use of appropriate packages (5) which are then placed into an outer packaging in a space-saving manner. With the above device and method, space saving of the packages (5) in an outer packaging (14) can be achieved in a simple manner.

21 Claims, 5 Drawing Sheets

DEVICE AND METHOD FOR GROUPING PACKAGES

CROSS-REFERENCE TO RELATED APPLICATIONS

This application claims foreign priority benefits under 35 U.S.C. §119(a)-(d) to German patent application number DE 102009031516.0, filed Jul. 2, 2009, which is incorporated by reference in its entirety.

TECHNICAL FIELD

The present invention relates to a device and a method for grouping packages.

BACKGROUND

In practice packaging systems are known with which packages are manufactured on a deep-draw packaging machine or tray sealing machine and then transported by conveyor belts singly and with the required spacing through or over inspection devices such as metal detectors and/or weighing machines. Then, these single packages are for example formed into groups, charged into an outer packaging, for example a carton, and put into storage. This can be carried out manually by a person or by a robot which takes the packages from the conveyor belt and puts them into the outer packaging.

To be able to use robots for automatically taking up packages from the conveyor belts the positions of the packages must be known or the packages must have a defined spacing to one another which is suitable for the gripper system. Preferably, gripper systems with vacuum cups are used here.

To save space and costs, which arise due to the area required by a number of packages in one plane, packages should be arranged as close together as possible or nested in the outer packaging. Packages usual in the food sector are plastic packages with a dimensionally stable surrounding edge, which also represents the sealing surface between the lower part and the lid film. Here, space reduction can be obtained by overlapping two adjacent packages by the width of the sealing edge. This overlapping in the outer packaging can be achieved with manual consecutive deposition of individual packages. With an automated system with a robot, this is possible through the transport of individual packages, but for high machine throughput, defined as packages per minute, this is not feasible.

A further known possibility is to take up packages with a gripper system, which is able to push the packages, still spaced during transport by a belt, towards one another into an outer packaging using a device on the gripper in order to produce the desired overlapping. A disadvantage is that these gripper systems are mechanically complicated and expensive and the accelerations and speeds are severely limited due to the increased weight.

SUMMARY

An object of the present disclosure is to provide a possibility of being able to realize a gripper system which can be manufactured easily, economically and with low weight and be moved with high accelerations and speeds.

This object of the present invention is solved by the present device that groups packages with a dimensionally stable protruding edge by moving the packages together and in doing so the protruding edges on a grouping belt overlap such that the edge of the preceding package comes to rest lying on the edge of the following package and the package may include a sidewall that limits the overlap distance of the respective edges.

A main field of application for the invention is in the use of packaged foodstuffs such as, for example, 100 g or 200 g portions of shingled slices of sausage. These portions are normally placed in ready-made trays or in the cavities of a deep-drawn film and the content of the package is evacuated before being sealed by a lid film in a sealing station and/or purged with gas to achieve a longer shelf life.

For reasons of visual appearance, suitable transport and/or storage, the tray or cavity is manufactured from a thicker film which is able to retain its shape even after the evacuation process and/or gas purging. The lid film is a thinner film which is sealed circumferentially on the edge of the package; thus a strong package results with a flat taut lid film which is usually printed or optionally fitted with a label providing details of ingredients, weight or price.

After manufacture on deep-draw packaging machines or tray sealing machines, these packages are singled out and transported with a larger spacing one behind the other on conveyor belts through inspection devices such as metal detectors and weighing machines and thus these packages arrive at the feed belt singly and spaced via a conveyor belt.

If the grouping belt following the feed belt is offset upwards in height, the position of the edge of the last package moved onto the grouping belt is situated above relative to the edge of the following package at the point in time of acceptance onto the grouping belt. Thus, overlapping can be achieved in a simple manner, because even a small vertical distance corresponding to at least the thickness of the package edge is sufficient. This distance, which can be made very small, is advantageous for a reliable and slip-free transfer of the package from the feed belt to the grouping belt.

In addition or alternatively to an offset in height, a device for tilting can be employed on the grouping belt with which a following package is tilted on the grouping belt to an angle to the preceding package such that when approaching the preceding package, the edge of the following package comes to rest overlapped below the edge of the preceding package. For this embodiment the use of stoppers or brakes for preceding packages can be advantageous to realize a relative movement between the following and preceding packages.

For a slip-free transfer from the feed belt onto the grouping belt a controller can control the speed of at least one belt such that for the time in which the package base is still on the feed belt or conveyor belt or is also already located on the grouping belt, the speeds of both belts are synchronized. This can be put to advantage in making further use of the package position, which has already been found on the feed or conveyor belt, for the determination of the package position on the grouping belt.

In order to reduce the spacing of the packages as is present on the conveyor belts to the desired spacing on the grouping belt, the speed of at least one belt is expediently controlled by the controller such that the speed of the following belt is slower than that of the preceding belt.

It may be necessary to transport the products gently. In this case high changes in speed and acceleration are to be avoided. Here, the large package spacing can be reduced, for example to 50%, by a first feed belt by controlling the belt speeds. The objective is to avoid stopping the conveyor, feed or grouping belts, because this leads to time and power losses in the system when stopping and restarting, because the accelerations should proceed smoothly. This requirement can be fulfilled by the use of several belts, which bring the spacing to the required spacing and speed in several stages by the closed-loop control of the belt speeds and the speed on the grouping belt, whereby the speed differences are the lower the more belts are present.

Once the edge of the following package has been moved under the edge of the preceding package, the position of these two packages in relation to one another has to be controlled. In the optimum and simplest form the rear side wall of the preceding package is used as an end-stop and thus as a known position of the following package to the preceding one and the space saving would be a maximum through this overlapping.

In order to acquire or control the position of packages or in particular a first package of a group of packages for the first time, light barriers or sensors can be used which are able to acquire a package wall or a tip of an edge of a package and to pass this information to the higher level controller so that the appropriate information can be passed on and made available for further processes such as belt transfers or positioning of the packages.

In order to limit the installed length of the device according to the invention, the packages can be arranged continuously on the grouping belt and overlapping at the package edge.

In contrast, if it is necessary for the following process that groups of packages are spaced to one another, this can also be realized with the device according to the present disclosure.

As a variant to a belt which transports the package retained and situated on it, embodiments are also conceivable in which the package is pushed over a plane and thus positioned by end-stops or slides, which for example are attached to a chain.

If the static frictional coefficient between the belt and the package base is very small so that during belt speed changes slippage can occur between the package base and the belt, which would lead to errors in the unknown change of position in the controller, an end-stop at the end of the grouping belt can define the position of the frontmost single package or a group of packages.

It is advantageous to know the position of the packages in order to be able to pass on this position information to a following system such as a gripper system for removal of the packages for further transport and placement in an outer packaging or for a further operational stage.

For maximum space saving it may be practicable to overlap the package edges in a second direction lying in the direction transverse to the first overlapping.

In order to increase the capacity of the packaging system the feed of packages can take place over several conveyor belts running in parallel and the transport can be realized by the gripper of n×m packages. For example, a complete two dimensional layer of packages could be charged for the container by the gripper system in one transport process in order to further increase the capacity of the packaging system.

In order to ensure a process as gentle and continuous as possible, it is practicable to remove the packages by the gripper system with the grouping belt running.

The present disclosure also provides a method of grouping packages with a dimensionally stable protruding edge on a grouping belt in which the spacing between the packages is reduced such that overlapping of the edge of the preceding package over the edge of the following package is produced.

This method according to the present disclosure is primarily used with packages which consist of a container and a preferably flat lid film which is circumferentially sealed onto the edge. These packages have intrinsically the required strength for overlapping and the package edge is in this respect so wide that there are potential savings in space and costs.

In the sequence of the method according to the present disclosure, packages which have been previously filled with product and sealed with a lid film and/or have passed through further operational and inspection stations, are fed, singled out, using one or more conveyor belts. In order to reduce the spacing between two adjacent packages the speed of one or more following feed belts is lower than the speed of the preceding conveyor belts. With the use of a number of belts the reduction of spacing can be implemented in stages by smaller differences in speed, leading to more gentle handling of the package or product.

For the slip-free transfer of the package from one belt to the next belt the controller controls the speeds of single or several belts to achieve synchronization of the speeds of two adjacent belts for the period of the package transfer.

On the grouping belt also groups of n packages can be formed with a spacing between the groups. This may be necessary depending on the technical embodiment of the gripper system which removes the packages from the grouping belt and transports them further.

In the following, advantageous embodiments of the present disclosure are explained in more detail with reference to the below drawings.

DETAILED DESCRIPTION

Figure 1:
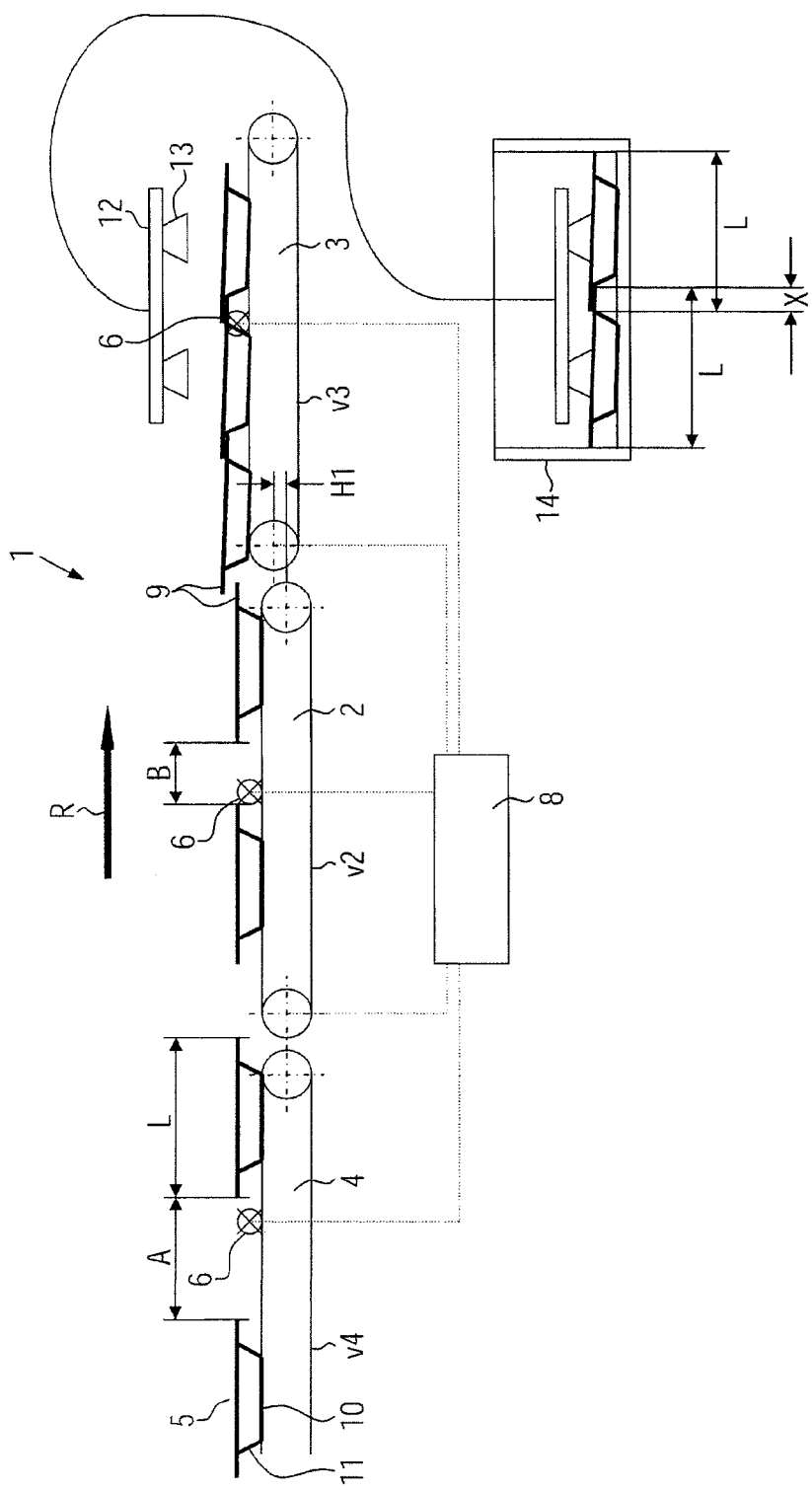
FIG. 1 is a schematic side view of a device according to the invention in a form with a feed belt and a grouping belt with a preceding conveyor belt and following gripper system.

In the figures identical components are designated with the same reference numerals throughout.

FIG. 1 illustrates a device 1 according to the present disclosure in an embodiment with a feed conveyor, such as a feed belt 2, and a grouping conveyor, such as a grouping belt 3, following the feed belt. Packages 5 are fed with a variable spacing A using a preceding conveyor belt 4. Since the speed v2 of the feed belt 2 is slower than the speed v4 of the conveyor belt 4, the spacing of two adjacent, consecutive packages 5 reduces from the spacing A on the conveyor belt 4 to a reduced spacing B of the packages 5 to one another on the feed belt 2.

A light sensor or barrier 6 for acquiring the position of the package 5 on the feed belt 2 passes a signal to a controller 8. Using the acquisition of the positions of the packages 5, the controller 8 controls the speed v2 of the feed belt 2 and/or the speed v3 of the grouping belt 3. Furthermore, an additional or alternative acquisition of the position of the packages 5 on the conveyor belt 4 is conceivable. Thus, the controller 8 is able to control the belt speeds predictively and thereby with lower speed differences of the individual belts 2, 3, 4 one to the other and to transport the packages 5 continuously and gently along the device 1.

FIG. 1 similarly illustrates that a height offset H1 is present from the feed belt 2 to the grouping belt 3. The edge 9 of the packages 5, which are located on the grouping belt 3, lies higher than the edge 9 of the package 5, which is located at the end of the feed belt 2.

With the aid of the information about the positions of the package 5 at the end of the feed belt 2 and the package 5 at the start of the grouping belt 3, the controller 8 controls the speed v2 of the feed belt 2 and/or the speed v3 of the grouping belt 3 such that on the transfer of the package 5 from the feed belt 2 onto the grouping belt 3 the edge 9 of the following package 5 comes to rest underneath the edge 9 of the preceding package 5.

During the transfer of the package 5 from the feed belt 2 onto the grouping belt 3, the speeds v2, v3 are synchronized such that no undesired slippage occurs between the package base 10 and the feed belt 2 as well as the grouping belt 3 and the edge 9 of the package 5 is positioned to a specified dimension for the overlap X.

The rear side wall 11 of the preceding package 5 can be used as a limit stop for the edge 9 of the following package 5. For this, the speed v3 of the grouping belt 3 is advantageously reduced or stopped with respect to the speed v2 of the feed belt 2. Alternatively, an end-stop can be present, which stops the preceding package 5 or the group while the belts 2, 3 continue to run.

This group of continuously overlapping packages 5 is transported further in order to accommodate a next package 5 from the feed belt 2. Once the group has reached the position where it can be taken up by a gripper system 12 and the gripper system 12 is again ready for acceptance, the gripper system 12 takes up the group of packages 5 using vacuum cups 13.

Due to the overlapping position of the packages 5 one to the other, a group of n packages, whereby n is defined as the number of packages 5 of a group in the transport direction R, is lifted by the vacuum grippers 13 of the gripper system 12 from the grouping belt 3 without the following packages 5 being negatively affected. The acceptance here preferably occurs with the grouping belt 3 running.

The gripper system 12 now places the group of packages 5 into an outer packaging 14. In doing so, the vacuum cups 13 release the packages 5 on reaching the required position. In the outer packaging 14 in the illustrated example the space saving is obtained by an overlap X. With a group of n packages with a package length L a space saving is achieved with approximately n−1 times overlap X of the package 5.

If the speed differences between v3 and v4 are to be low or robust packages and/or products are used, the feed belt 2 can be omitted and the conveyor belt 4 takes over the functions of the feed belt 2 with respect to the grouping belt 3.

Figure 2:
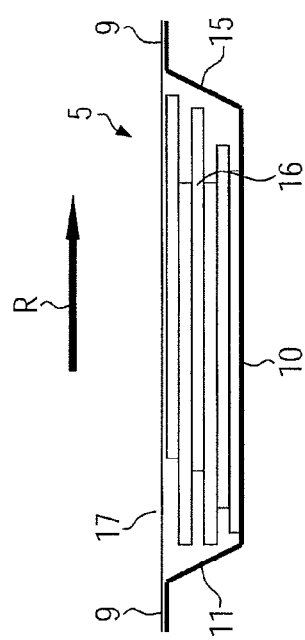
FIG. 2 is a schematic side view of a package for the purpose of a use according to the invention.

FIG. 2 illustrates a package 5 for the use according to the present disclosure. This consists of a tray or a deep-drawn moulding of a film with a package base 10, a front side wall 15 referred to the transport direction R, a rear side wall 11 and a package edge 9, which need not necessarily have the same dimensions at the front and rear. The product 16, which in FIG. 2 is shown schematically as shingled slices, preferably food such as slices of sausage or cheese, is placed in this tray or deep-drawn moulding in a placement area which is not shown. The tray is sealed, preferably under vacuum and/or atmospheric replacement using gas purging, with a lid film 17.

Figure 3:
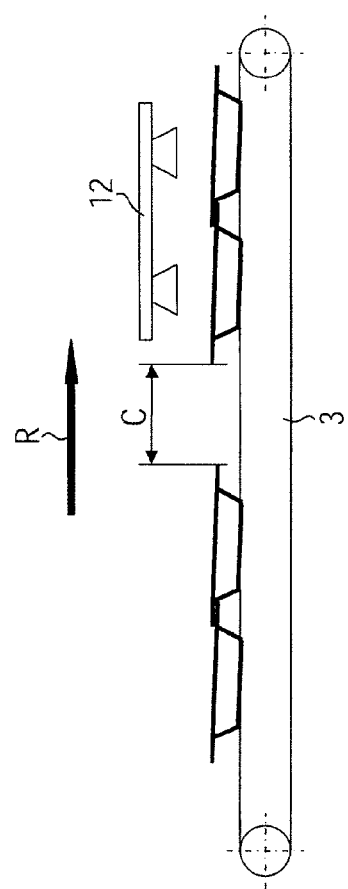
FIG. 3 is a schematic side view of a grouping belt with spaced groups of packages.

In FIG. 3 a second embodiment of the method according to the present disclosure is illustrated in which groups of n packages are positioned on the grouping belt 3 with a spacing C, because this may be practicable or even necessary for certain variants of gripper. In an embodiment which is not illustrated the grouping and/or feed belt can be adjusted in height in order to be able to make adjustments depending on the package dimensions such as the thickness of the package edge or the overlap in alternating sequence, overlapping above or below.

Figure 4:
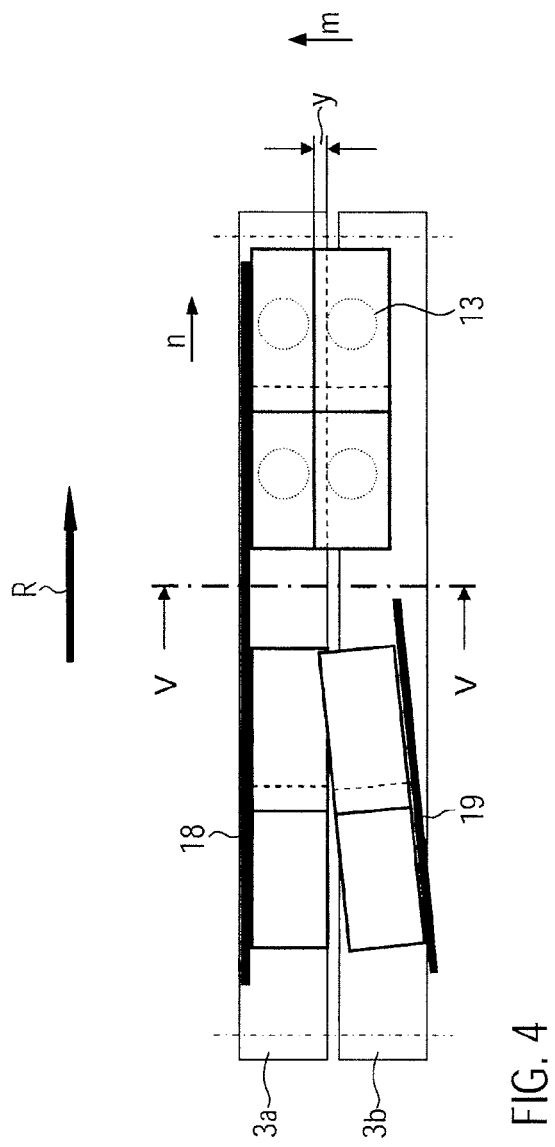
FIG. 4 is a schematic side view and vertical section of a multi-track belt system.
Figure 5:
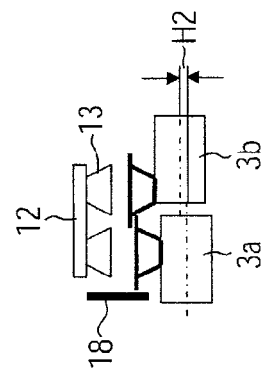
FIG. 5 is a schematic vertical section through the device at the point designated by V-V in FIG. 4.

FIGS. 4 and 5 illustrate a further development of the device 1 according to the present disclosure in which an additional, side overlap Y of the package 5 is realized transversely to the transport direction R. This is achieved by means of an abutment strip 18 on a first grouping belt 3a and a guide strip 19 on a second grouping belt 3b. These two grouping belts 3a and 3b do not have to be arranged parallel and also an angled position in support of the guide strip 19 is possible. The grouping of the packages 5 in the transport direction R on the grouping belts 3a and 3b occurs on these belts and the synchronization of the groups one to the other is realized on the grouping belts 3a, 3b by controlling the belt speeds in order to ensure the position in the transport direction R during the process of side overlapping. During the transport movement on the grouping belt 3b along the guide strip 19 the packages approach the packages on the grouping belt 3a. The abutment strip 18 is used as a counter-stop for transverse forces occurring on the packages 5 on the grouping belt 3a and as a defined position during removal by the gripper system 12. Here, an embodiment with more than two grouping belts 3 and other systems for bringing the packages 5 closer one to the other for overlapping are conceivable.

FIG. 5 illustrates a vertical section at the point V-V in FIG. 4. In FIG. 5 the height offset H2 between the grouping belts 3a and 3b is illustrated. Here, the packages 5 on the grouping belt 3b, which are already overlapped in the transport direction R, are pushed over the packages 5 on the grouping belt 3a by means of the guide strip 19. Towards the end of both grouping belts 3a, 3b a two-dimensional group with a number n×m of packages, whereby m is defined as the number of packages 5 of a group transverse to the transport direction R, can be removed and transported further as a group by the gripper system 12 by means of the vacuum grippers 13.

Figure 6:
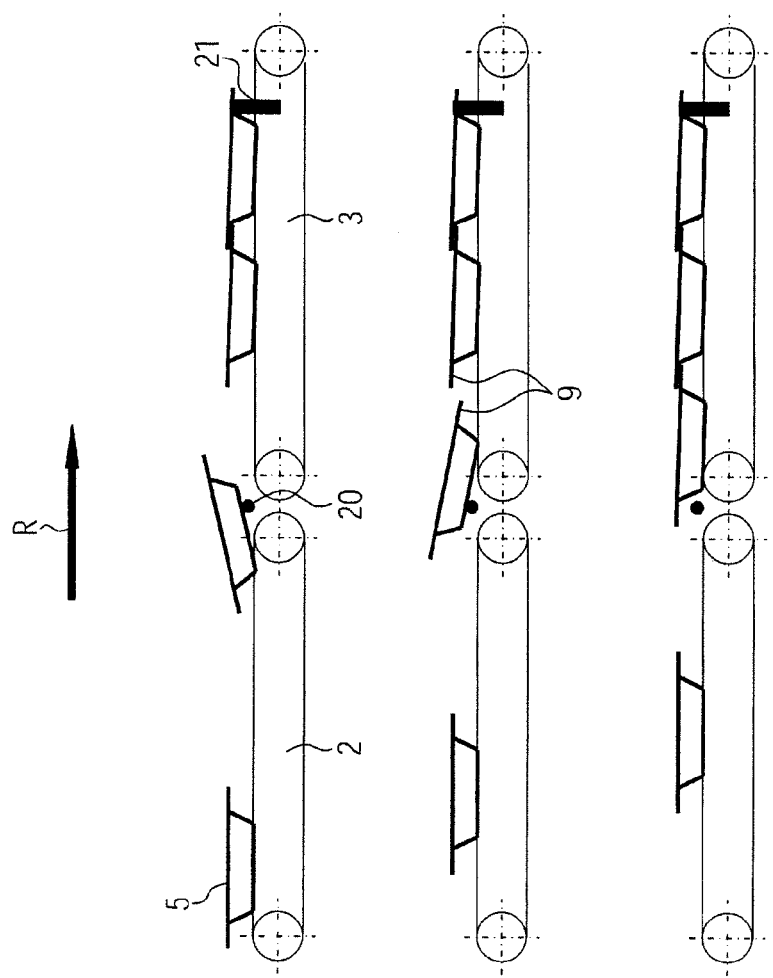
FIG. 6 is a variant of the device.

An embodiment with a device 20 for tilting a package 5 during the transfer from the feed belt 2 to the grouping belt 3 is illustrated in FIG. 6. In a simple technical embodiment this may involve a bar, a roller or other component with good sliding or rolling properties, on which the package 5 is pushed by the feed belt 2 and after tilting about the axis of the device 20 comes into contact with the grouping belt 3 at an angle to the plane of the grouping belt 3 in order to be moved on further by it in the transport direction R and to come to rest under the package edge 9 of the preceding package 5. In this connection it is necessary to stop the preceding package 5 or group by an end-stop 21 while the grouping belt 3 moves on further and the package edge 9 is brought up against the rear side wall 11 of the preceding package 5. The device 20 can also be used for overlapping the following package 5 over the preceding package 5. This is determined by the position of the preceding package 5 on the grouping belt 3.

The device 20 is not restricted in being located in the region of the transfer from the feed belt 2 to the grouping belt 3. Similarly, it is conceivable that the overlapping occurs after the transfer to the grouping belt 3.

In a further embodiment it is conceivable that overlapping is carried out in the transverse direction first and then in the longitudinal direction.

Figure 7A:
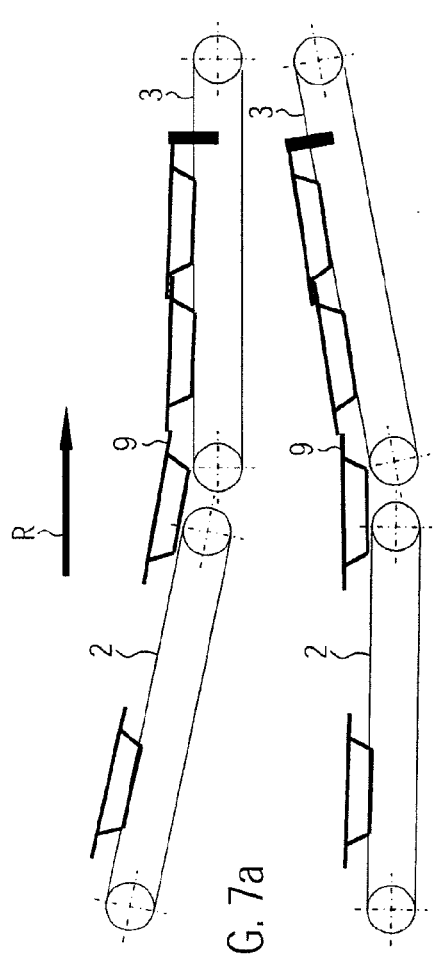
FIGS. 7a, 7b show a further variant of the device.
Figure 7B:
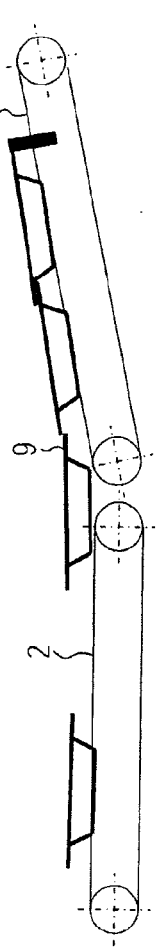

In FIGS. 7a, 7b a further embodiment is illustrated in which the transport surfaces of the feed belt 2 and of the grouping belt 3 are tilted to one another at an angle of less than 180° in order to position the package edge 9 of the following package 5 underneath the packing edge 9 of the preceding package 5 during the transfer of the package from the feed belt 2 to the grouping belt 3.

Figure 8:
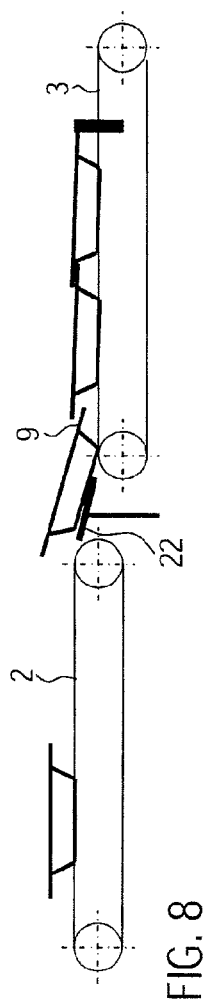
FIG. 8 is a further variant of the device.
Figure 9:
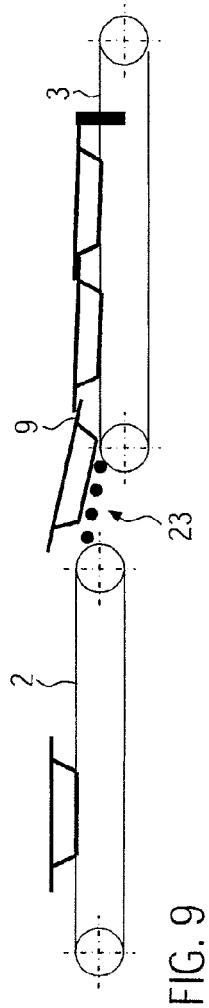
FIG. 9 is a further variant of the device.

For a use where tilting of the feed belt to the grouping belt is not possible, devices such as a slide 22 as shown in FIG. 8, or a roller conveyor 23, as shown in FIG. 9, can be fitted in front of the grouping belt 3. Other devices which operate in a similar way are also conceivable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A device for grouping of packages that each have a dimensionally stable protruding edge, the device comprising:
   at least one grouping belt for transporting packages; and
   a conveying mechanism for moving two adjacent packages, including a preceding package and a following package, towards one another wherein the preceding package has a rear edge extending outwardly from a top side of a rear sidewall and the following package has a front edge extending outwardly from a top side of a front sidewall, and the conveying mechanism operable for overlapping the protruding edges of the packages such that one of the rear edge of the preceding package is located above the front edge of the following package and the rear edge of the preceding package is located below the front edge of the following package by conveying in the following package at a speed greater than a speed of conveyance of the preceding package when at least the preceding package and at least a portion of the following package are located on the grouping belt and wherein one of the front and the rear sidewall limits an overlap distance of the rear edge and the front edge.

2. A device according to claim 1 wherein the device is configured for use with packages that each include a container defining the edge, and a lid film which is circumferentially sealed onto the edge.

3. A device according to claim 1 further comprising a conveyor belt that precedes the grouping belt and that feeds single packages to the grouping belt.

4. A device according to claim 3 wherein the conveying mechanism comprises the conveyor belt, and wherein a transport plane of the conveyor belt is arranged below a transport plane of the grouping belt.

5. A device according to claim 3 wherein the conveying mechanism comprises a controller which controls the speed of at least one belt so that on the transfer of a particular package from the conveyor belt to the grouping belt the speeds of both belts are synchronized.

6. A device according to claim 5 wherein the controller is adapted to control the speed of at least one belt in order to reduce the spacing of the preceding package and the following package on the grouping belt.

7. A device according to claim 3 further comprising at least one light barrier for acquiring a position of one of the packages on the conveyor belt and/or grouping belt.

8. A device according to claim 1 wherein the conveying mechanism comprises a device associated with the grouping belt to bring the packages to an angle in relation to the grouping belt.

9. A device according to claim 1 wherein the device is configured to position the packages on the grouping belt continuously and such that adjacent edges are overlapping.

10. A device according to claim 1 wherein the device is configured to arrange the packages in groups that are spaced apart from each other on the grouping belt.

11. A device according to claim 1 further comprising an end-stop provided on the grouping belt to define a position of a package.

12. A device according to claim 1 further comprising a gripper system that is configured to transport a group of packages away from the grouping belt.

13. A method of grouping packages on a grouping belt comprising: conveying a preceding package and a following package on a grouping belt wherein the preceding package includes a rear edge extending outwardly from a top of a rear sidewall and the following package includes a front edge extending outwardly from a top of a front sidewall; conveying the following package at a rate greater than a rate of conveyance of the preceding package while one of at least a portion of the front edge of the following package is below the rear edge of the preceding package and the front edge of the following package is above the rear edge of the preceding package; and overlapping one of the rear edge of the preceding package over the front edge of the following package and the rear edge of the preceding package under the front edge of the following package by an overlap distance wherein one of the front and the rear sidewalls limits the overlap distance, whereby the preceding package and the following package are grouped together on the grouping belt.

14. A method according to claim 13 wherein each package includes a deep-drawn tray that defines the edge, and a lid film that is circumferentially sealed onto the edge.

15. A method according to claim 13 wherein spacing of two adjacent packages is reduced by closed-loop control of a speed of at least one belt.

16. A method according to claim 13 further comprising transferring packages from a feed belt to the grouping belt, and controlling speed of at least one belt by a controller so that on the transfer of a particular package from the feed belt to the grouping belt the speeds of both belts are synchronized.

17. A method according to claim 13 wherein the method is carried out such that groups of multiple packages are arranged on the grouping belt, and the groups are spaced apart from each other.

18. A method according to claim 13 wherein the overlapping occurs in a transport direction, and the method further comprises overlapping additional edges of the preceding package and the following package in a direction transverse to the transport direction.

19. A method according to claim 13 further comprising transporting a group of "n" packages away from the grouping belt with a gripper system.

20. A method of grouping packages on a grouping belt comprising: conveying a first package and a second package on a conveying belt, the second package behind the first and wherein each package comprises a front sidewall, a rear sidewall, and a dimensionally stable protruding front edge that extends outwardly from a top of the front side wall and a dimensionally stable rear edge that extends outwardly from a top of the rear sidewall;
   conveying the second package at a rate faster than a conveying rate of the first package while at least a portion of the front edge of said second package is lower than the rear edge of said first package;
   overlapping the rear edge of said first package over the front edge of the second package to form a package group wherein the rear sidewall of the first package limits an overlap distance of the rear edge of the first package and front edge of the second package.

21. The method of grouping packages of claim 20 further comprising conveying a third package behind the second package, wherein the third package comprises a front sidewall, a rear sidewall, and a dimensionally stable protruding front edge that extends outwardly from a top of the front side wall and a dimensionally stable rear edge that extends outwardly from a top of the rear sidewall;

- conveying the third package at a rate faster than a conveying rate of the second package while at least a portion of the rear edge of said second package is lower than the front edge of said third package;
- overlapping the front edge of said third package over the rear edge of the second package to form a package group of the first, second and third packages wherein the front sidewall of the third package limits an overlap distance of the front edge of the third package and rear edge of the second package.

\* \* \* \* \*